US005364551A

United States Patent [19]

Lentsch et al.

[11] Patent Number: 5,364,551

[45] Date of Patent: Nov. 15, 1994

[54] REDUCED MISTING OVEN CLEANER

[75] Inventors: Steven E. Lentsch; Cynthia A. Keller, both of St. Paul; Gregory T. Bona, New Brighton; Victor F. Man, Minneapolis, all of Minn.

[73] Assignee: Ecolab Inc., St. Paul, Minn.

[21] Appl. No.: 123,437

[22] Filed: Sep. 17, 1993

[51] Int. Cl.[5] .......................... C11D 1/86; C11D 1/32; A21B 3/16

[52] U.S. Cl. .................................... 252/156; 252/142; 252/145; 252/146; 252/160

[58] Field of Search ............... 252/156, 142, 140, 145, 252/146, 153, 160, 544

[56] References Cited

U.S. PATENT DOCUMENTS

| | | | |
|---|---|---|---|
| 2,982,738 | 5/1961 | Schmolka | 252/153 |
| 3,644,210 | 2/1972 | Crotty | 252/548 |
| 3,736,259 | 5/1973 | Buck et al. | 252/140 |
| 3,779,933 | 12/1973 | Eisen | 252/118 |
| 3,813,343 | 5/1974 | Mukai et al. | 252/111 |
| 3,829,387 | 8/1974 | Wise et al. | 252/156 |
| 4,184,975 | 1/1980 | Krings et al. | 252/140 |
| 4,214,915 | 7/1980 | Dillarstone et al. | 134/19 |
| 4,676,920 | 6/1987 | Culshaw | 252/163 |
| 4,767,563 | 8/1988 | de Buzzaccarini | 252/174.25 |
| 4,877,691 | 10/1989 | Cockrell, Jr. | 428/688 |

FOREIGN PATENT DOCUMENTS

| | | |
|---|---|---|
| 1047903 | 2/1979 | Canada . |
| 1211674 | 9/1986 | Canada . |
| 1523491 | 9/1978 | United Kingdom . |
| 2019876 | 11/1979 | United Kingdom . |
| WO92/02309 | 2/1992 | WIPO . |

OTHER PUBLICATIONS

"Xanthan Gum With Altered Rheology, KELZAN* AR", Technical Bulletin DB-32, Kelco Division of Merck & Co., Inc., pp. 1-8 (1985).

*Primary Examiner*—Arthur C. Prescott
*Attorney, Agent, or Firm*—Merchant, Gould, Smith, Edell, Welter & Schmidt

[57] ABSTRACT

Spray-on cleaners that can be delivered by pump or pressurized gas aerosol spray head have been known to cause respiratory distress in the form of a choking mist. The choking mist associated with aerosol use can be reduced or eliminated by formulating surface cleaning compositions that can be dispensed through a spray head resulting in an aerosol or mist droplet having a median particle size greater than about 170 μm, more preferably 200 μm. We have found that typical spray-on cleaners have a median particle size less than about 170 μm and, depending on the concentration and degree of irritation of strong base or strong acid components can cause severe respiratory distress. Preferred thickeners have been found for use in the non-choking aerosol or mist compositions.

31 Claims, No Drawings

REDUCED MISTING OVEN CLEANER

FIELD OF THE INVENTION

The invention relates to aqueous alkaline cleaners that can be used to remove stubborn soils from food preparation units, and aqueous acidic cleaners that are used to remove soils from hard surfaces such as counters, tables, floors and walls. In particular, the invention relates to aqueous alkaline materials that can be applied, in the form of an aerosol or pump spray, onto stubborn soils present in food preparation units such as gas or electrically heated ovens, microwave ovens, toaster ovens, etc. The term oven includes ovens, deep fryers, grills and hoods.

BACKGROUND OF THE INVENTION

Acidic and alkaline cleaning compositions for hard surfaces have been used for many years to remove stubborn soils from a variety of surfaces found in household and institutional locations. Such soils include inorganic soils and soils derived from organic sources, such as fats, oils, proteins and carbohydrates. Such soils when heated can form hard tenacious deposits on a variety of surfaces including ceramic, stainless steel, concrete, tile and metal food preparation surfaces. Typical inorganic solids comprise insoluble materials derived from the hardness components of service water including substantially insoluble salts of calcium, magnesium, iron, manganese, etc. Such inorganic salts can be combined in some cases with organic residues which can form large, difficult to remove soil deposits. These soils can be unsightly, can take the form of large deposits of charred or baked-on residue, or large areas of white insoluble soap scum or hardness deposits. These soils can also promote or support the growth of microorganisms that can under certain circumstances contaminate food or other contaminatable materials or surfaces.

A variety of cleaning compositions have been developed to deal with the tenacious organic and organic/inorganic matrix soils common in a variety of surfaces. One particularly useful form of cleaner is an aqueous alkaline cleaner commonly delivered from a pressurized aerosol or pump spray device. These types of cleaners have great utility for a variety of surfaces because the material can be delivered by spray to vertical, overhead or inclined surfaces or to surfaces having a complex curved or convoluted surface while achieving substantially complete coverage of the surface with the spray-on liquid cleaner. Acid spray-on cleaners are also known for removing basic inorganic soils and are becoming more common.

One substantial problem that arises with such spray-on materials relates to an airborne mist or finely divided aerosol generated during the spraying process. The aqueous liquid is converted by the action of propellant or pump action into a spray that is accompanied by a finely divided aerosol or mist. The spray portion contacts and remains on the target surface, while a substantial proportion of the aerosol can remain suspended in the atmosphere.

Such aqueous compositions having a strong acid or strong base cleaning component in the form of a finely divided aerosol or mist can cause respiratory distress in the user. Upon breathing the finely divided aerosol or mist, a very strong and irrepressible choking response is seen in most individuals that come in contact with irritating proportions of the aerosol produced by typical spray-on cleaners. The choking response is inconvenient, reduces cleaning efficiency in a variety of applications and in sensitive individuals can cause asthma attacks, respiratory damage, or other discomfort or injury.

To alleviate, to some degree, the choking response, some products have been formulated with reduced quantities of the strongly alkaline or strongly acid cleaning components to reduce the choking response. Strong caustic has been replaced by reduced alkalinity bases such as bicarbonate or by solvent materials. The reduction in concentration or substitution of these materials can often reduce the cleaning activity and effectiveness of the material when used.

Crotty et al., U.S. Pat. No. 3,644,210, teach an alkaline cleaning material useful for removing burnt-on, baked-on food and grease from cooking surfaces comprising substantial proportions of alkali metal hydroxide in an aqueous cleaning base. Eisen, U.S. Pat. No. 3,779,933, teaches an aqueous alkali metal cleaning composition using clay and organic thickening materials. Mukai et al., U.S. Pat. No. 3,813,343, teach oven cleaning compositions containing an amine or ammonia base combined with dimethyl sulfoxide solvent and other compositions. Wise et al., U.S. Pat. No. 3,829,387, teach caustic cleaning compositions containing substantial proportions of sodium hydroxide, clay thickeners, and solvents in an aqueous base. Dillarstone et al., U.S. Pat. No. 4,214,915, and Canadian Patent No. 1,523,491, teach oven cleaning compositions using a relatively mild base such as sodium carbonate and sodium bicarbonate in an aqueous cleaning material. Culshaw, U.S. Pat. No. 4,676,920, teaches a thickened viscous scouring material using surfactants, abrasives and solvents for soil removal. De Buzzaccarini, U.S. Pat. No. 4,767,563, teach liquid scouring cleaning compositions using solvents, abrasives and surfactants for soil removal from hard surfaces. Cockrell, Jr., U.S. Pat. No. 4,877,691 (International Application No. PCT/US91/05092) teaches a barrier coating composition used to pretreat an oven to promote the subsequent removal of hardened baked-on soils that form on the pretreatment material. Dimond et al., Canadian Patent No. 1,047,903, teach oven cleaning compositions having reduced proportions of sodium hydroxide which are thickened using a bentonite in a substantially aqueous base. Silvester, Canadian Patent No. 1,211,674, teaches an improved oven cleaner using sodium bicarbonate as an alkali, glycerol as a solvent, a clay thickener in an aqueous formulation for oven cleaning. Flannery, United Kingdom Patent No. 2,019,876, teaches an aerosol comprising sodium bicarbonate as an oven cleaner.

The prior art taken as a whole shows that skilled artisans in experimenting with improving acid and alkaline hard surface cleaners, in particular alkaline oven cleaners, have attempted to reduce concentrations of sodium hydroxide to reduce the choking response. Ammonia or an organic base has been used to replace sodium hydroxide in reduced alkaline cleaners. Other relatively mild inorganic basic materials, such as sodium carbonate or sodium bicarbonate have also been used to replace sodium hydroxide. A variety of organic surfactants or glycol, alkyl ether or dimethyl sulfoxide solvent materials have been used to enhance the detergent properties of the reduced alkaline materials.

The prior art taken as a whole has attempted to replace sodium hydroxide to reduce choking response but does not recognize that the choking properties of these cleaners is related to the median particle size of the aerosol. For this reason, no attempt has been made in the prior art to formulate to adjust the particle size of the aerosol to reduce respiratory distress or choking reflex.

BRIEF DESCRIPTION OF THE INVENTION

We have found that either aqueous strong acid or aqueous strong base cleaning compositions that are used in a spray-on format can have a reduced chocking response or can be made substantially non-choking by producing a formulation that when sprayed results in the creation of an airborne aerosol or mist having a median particle size greater than about 170 μm, preferably greater than about 200 μm. The materials of the invention produce little or no small particle aerosol. The concentration of small particle airborne aerosol from a median particle size greater than 200 μm is not sufficient to cause respiration difficulty. Aerosol sprays, either propellant driven or pump driven, create a spray pattern of the aqueous liquid that contacts the target surface. Some spray nozzles produce a greater proportion of small particle airborne aerosol than others. The major proportion of the liquid comes to reside in large sprayed-on deposits which contact and remain on a target surface. A small proportion of the sprayed liquid becomes an airborne aerosol or mist. The mist or aerosol particle size, discussed above, relates to the mist created during the spray action and is not directed to the material sprayed which remains in contact with the target surface. Any spray pattern created during spraying operations will contain an array of large and small spray particles which do not become airborne and are transported directly to and remain in place on the treated surface. We are not concerned with the proportion of the spray that remain on the target surface. We are primarily concerned only with the portions of the sprayed material that take the form of a small particle size aerosol or mist that can remain suspended in or transported by the atmosphere for a substantial period of time at least 5 seconds, typically 30 seconds to 10 minutes after spraying.

The improved compositions of the invention comprise aqueous materials comprising a strong acid or a strong base, an organic surfactant, an organic polymeric thickener, and a variety of other useful optional ingredients. The cleaners of the invention can be packaged in pressurized aerosol spray units using commonly available pressure containers, aerosol valves and aerosol propellants. The cleaners of the invention can be used in a pump spray format using a pump spray head and a suitable container. The materials are typically applied to hard surfaces containing difficult inorganic, organic, or matrix-blended soils. Such soils include baked-on or carbonized food residues. Other surfaces can contain soils derived from substantially insoluble hardness components of service water. The enhanced cleaning compositions of the invention rapidly remove such soils because the cleaners have a unique combination of cleaning ingredients combined with thickeners that can rapidly remove the soils but resist formation of an amount of mist or aerosol during application that can cause respiratory distress. For the purpose of this application, the terms "aerosol" and "mist" refer to airborne dispersions of small particles comprising the cleaning composition that can remain suspended or dispersed in the atmosphere surrounding a cleaning site for at least 5 seconds, more commonly 30 seconds to 10 minutes. We have found in our research that the respiratory distress or involuntary choking response caused by the inhalation of such mist, depending on the irritation capacity of the cleaning components, is inversely proportional to the particle size of the aerosol or mist. We have found that strongly irritating, strongly acidic or basic materials are increasingly irritating as the median particle size drops below about 200 μm and mildly irritating materials tend to become irritating as the median particle size drops below about 170 μm. However, any sprayable composition can be rendered at worse, mildly irritating if the median particle size of its aerosol or mist created upon spraying is maintained at greater than 200 μm, preferably greater than 210 μm.

DETAILED DESCRIPTION OF THE INVENTION

The sprayable aqueous cleaning compositions of the invention typically comprise either a strong acid or strong base in combination with an organic surfactant, and an effective organic thickener material in an aqueous composition. The compositions of the invention can contain a variety of other optional ingredients recited below.

Strong Base

The liquid aqueous cleaner compositions of the invention can contain a strong base material or a source of alkalinity which can be an organic source or an inorganic source of alkalinity. For the purposes of this invention, a source of alkalinity also known as a basic material is a composition that can be added to an aqueous system and result in a pH greater than about 7. Organic sources of alkalinity are often strong nitrogen bases including, for example, ammonia, monoethanol amine, monopropanol amine, diethanol amine, dipropanol amine, triethanol amine, tripropanol amine, etc. One value of using the monoalkanol amine compounds relates to the solvent nature of the liquid amines. The use of some substantial proportion of a monoethanol amine, monopropanol amine, etc. can provide substantial alkalinity but can also provide substantial solvent power in combination with the other materials in the invention. The source of alkalinity can also comprise an inorganic alkali. The inorganic alkali content of the spray-on cleaners of the invention is preferably derived from sodium or potassium hydroxide which can be used in both liquid (about 10-60 wt % aqueous solution) or in solid (powder, flake or pellet) form. Preferably the preferred form of the alkali metal base is commercially available sodium hydroxide which can be obtained in aqueous solution at concentrations of about 50 wt % and in a variety of solid forms of varying particle size and shapes. Other inorganic alkalinity sources are soluble silicate compositions such as sodium metasilicate or soluble phosphate compositions such as trisodium phosphate.

Strong Acid

The aqueous cleaning compositions of the invention can contain as a primary cleaning agent an acid composition that can typically be a strong acid or a strong acid combined with a weak acid. For the purposes of this invention, an acid material is a composition that can be added to an aqueous system and result in a pH less than about 7. Strong acids that can be used in the aqueous cleaners of the invention include acids which substantially dissociate in an aqueous solution (strong acid) such as hydrochloric acid, sulfuric acid, trichloroacetic acid, trifluoroacetic acid, nitric acid and others. "Weak" organic and inorganic acids can be used in the invention as a component of the acid cleaner. Weak acids are acids in which the first dissociation step of a proton from the acid cation moiety does not proceed essentially to completion when the acid is dissolved in water at ambient temperatures at a concentration within the range useful to form the present cleaning composition. Such inorganic acids are also referred to as weak electrolytes as the term is used in the text book *Quantitative Inorganic Analysis*, I. M. Koltoff et al., published by McMillan Co., Third Edition, 1952, pp. 34–37. Most common commercially available weak organic and inorganic acids can be used in the invention. Examples of weak organic and inorganic acids include phosphoric acid, sulfamic acid, acetic acid, hydroxy acetic acid, citric acid, benzoic acid, tartaric acid, maleic acid, malic acid, fumaric acid and the like. We have found in certain applications that mixtures of strong acid with weak acid or mixtures of a weak organic acid and a weak inorganic acid with a strong acid can result in surprisingly increased cleaning efficiency. Such acid cleaners tend to be most effective to clean basic organic and inorganic soils. The soil most commonly cleaned using acid cleaners involves the soils resulting from the precipitation of hardness components of service water with cleaning compositions or food soils that can precipitate in the presence of calcium, magnesium, iron, manganese or other hardness components. Such soils include dairy residue, soap scum, saponified fatty acids or other marginally soluble anionic organic species that can form a soil precipitate or matrix when combined and contacted with divalent hardness components of service water.

Surfactant

The aqueous cleaning compositions of the invention can contain an organic surfactant composition. Anionic, nonionic, cationic or amphoteric surfactants can be used. Anionic materials that can be used in the aqueous compositions of the invention are surfactants containing a large lipophilic moiety and a strong anionic group. Such anionic surfactants contain typically anionic groups selected from the group consisting of sulfonic, sulfuric or phosphoric, phosphonic or carboxylic acid groups which when neutralized will yield sulfonate, sulfate, phosphonate, or carboxylate with a cation thereof preferably being selected from the group consisting of an alkali metal, ammonium, alkanol amine such as sodium, ammonium or triethanol amine. Examples of operative anionic sulfonate or sulfate surfactants include alkylbenzene sulfonates, sodium xylene sulfonates, sodium dodecylbenzene sulfonates, sodium linear tridecylbenzene sulfonates, potassium octyldecylbenzene sulfonates, sodium lauryl sulfate, sodium palmityl sulfate, sodium cocoalkyl sulfate, sodium olefin sulfonate.

Nonionic surfactants carry no discrete charge when dissolved in aqueous media. Hydrophilicity of the nonionic is provided by hydrogen bonding with water molecules. Such nonionic surfactants typically comprise molecules containing large segments of a polyoxyethylene group in conjunction with a hydrophobic moiety or a compound comprising a polyoxypropylene and polyoxyethylene segment. Polyoxyethylene surfactants are commonly manufactured through base catalyzed ethoxylation of aliphatic alcohols, alkyl phenols and fatty acids. Polyoxyethylene block copolymers typically comprise molecules having large segments of ethylene oxide coupled with large segments of propylene oxide. These nonionic surfactants are well known for use in this art area.

The lipophilic moieties and cationic groups comprising amino or quaternary nitrogen groups can provide surfactant properties to molecules. As the name implies to cationic surfactants, the hydrophilic moiety of the nitrogen bears a positive charge when dissolved in aqueous media. The soluble surfactant molecule can have its solubility or other surfactant properties enhanced using low molecular weight alkyl groups or hydroxy alkyl groups. Cationic surfactants can be used in the acidic or basic compositions of the invention. One preferred cationic surfactant material is an oxygen containing amine compound such as an amine oxide. The preferred class of cationic surfactants include tertiary amine oxide surfactants. Tertiary amine oxide surfactants typically comprise three alkyl groups attached to an amine oxide (N→O). Commonly the alkyl groups comprise two lower ($C_{1-4}$) alkyl groups combined with one higher $C_{6-24}$ alkyl groups, or can comprise two higher alkyl groups combined with one lower alkyl group. Further, the lower alkyl groups can comprise alkyl groups substituted with hydrophilic moiety such as hydroxyl, amine groups, carboxylic groups, etc. Preferred amine oxide materials for the invention comprise dimethylcetylamine oxide, dimethyllaurylamine oxide, dimethylmyristylamine oxide, dimethylstearylamine oxide, dimethylcocoamine oxide, dimethyldecylamine oxide, and mixtures thereof.

Amphoteric surfactants can be useful in the invention. Amphoteric surfactants contain both an acidic and a basic hydrophilic moiety in the structure. These ionic functions may be any of the ionic or cationic groups that have just been described previously in the sections relating to anionic or cationic surfactants. Briefly, anionic groups include carboxylate, sulfate, sulfonate, phosphonate, etc. while the cationic groups typically comprise compounds having amine nitrogens. Many amphoteric surfactants also contain ether oxides or hydroxyl groups that strengthen their hydrophilic tendency. Preferred amphoteric surfactants of this invention comprise surfactants that have a cationic amino group combined with an anionic carboxylate or sulfonate group. Examples of useful amphoteric surfactants include the sulfobetaines, N-coco-3,3-aminopropionic acid and its sodium salt, n-tallow-3-amino-dipropionate disodium salt, 1,1-bis(carboxymethyl)-2-undecyl-2-imidazolinium hydroxide disodium salt, cocoaminobutyric acid, cocoaminopropionic acid, cocoamidocarboxy glycinate, cocobetaine. Preferred amphoteric surfactants for use in the compositions of the invention include cocoamidopropylbetaine and cocoaminoethylbetaine.

Aqueous Compatible Solvents

The cleaner materials of the invention can contain a compatible solvent. Suitable solvents are soluble in the aqueous cleaning composition of the invention at use proportions. Preferred soluble solvents include lower alkanols, lower alkyl ethers, and lower alkyl glycol ethers. These materials are colorless liquids with mild pleasant odors, are excellent solvents and coupling agents and are typically miscible with aqueous cleaning compositions of the invention. Examples of such useful solvents include methanol, ethanol, propanol, isopropanol and butanol, isobutanol, ethylene glycol, diethylene glycol, triethylene glycol, propylene glycol, dipropylene glycol, mixed ethylene-propylene glycol ethers. The glycol ethers include lower alkyl ($C_{1-8}$ alkyl) ethers including propylene glycol methyl ether, propylene glycol ethyl ether, propylene glycol propyl ether, dipropylene glycol methyl ether, dipropylene glycol ethyl ether, tripropylene glycol methyl ether, ethylene glycol methyl ether, ethylene glycol ethyl ether, ethylene glycol butyl ether, diethylene glycol methyl ether, diethylene glycol butyl ether, ethylene glycol dimethyl ether, ethylene glycol monobutyl ether, and others. The solvent capacity of the cleaners can be augmented by using monoalkanol amines.

Thickeners or Viscosity Modifiers

The compositions of the invention require the presence of a material that will provide a composition that is thixotropic, in other words the material when left undisturbed (in a shear mode), retains a high viscosity. However, when sheared, the viscosity of the material is substantially but reversibly reduced. After the shear action is removed, the viscosity returns. These properties permit the application of the material through a spray head. When sprayed from an aerosol container using a propellant, the material undergoes shear as it is drawn up a feed tube into a aerosol spray head under the influence of the pressure of a propellant or is sheared by the action of a pump in a pump action sprayer. In either case, the viscosity must drop to a point such that substantial quantities of the material can be applied using the spray devices used to apply the material to a soiled surface. However, once the material comes to rest on a soiled surface, the materials should regain high viscosity to ensure that the material remains in place on the soil. Preferably, the material can be applied to a surface resulting in a substantial coating of the material that provides the cleaning components in sufficient concentration to result in lifting and removal of the hardened or baked-on soil. While in contact with the soil on vertical or inclined surfaces, the thickeners in conjunction with the other components of the cleaner minimize dripping, sagging, slumping or other movement of the material under the effects of gravity. The material should be formulated such that the viscosity of the material is adequate to maintain contact between substantial quantities of the film of the material with the soil for at least a minute, preferably five minutes or more.

A variety of well known organic thickener materials are known in the art. Preferred thickeners for use in this invention are natural polymers or gums derived from plant or animal sources. Such materials are often large polysaccharide molecules having substantial thickening capacity.

A substantially soluble organic thickener is used to provide thixotropy to the compositions of the invention. The preferred thickeners have some substantial proportion of water solubility to promote easy removability. Examples of soluble organic thickeners for the aqueous compositions of the invention comprise carboxylated vinyl polymers such as polyacrylic acids and sodium salts thereof, boric acid, diethanolamide, coco-diethanolamide, coco-monoethanolamide, stearic-diethanolamide, ethoxylated cellulose, hydroxyethyl styrylamide, oleic-diethanolamide, stearic-monoethanolamide, cetyl alcohol, steroyl alcohol, polyacrylamide thickeners, ethanol glycol disterate, xanthan compositions, sodium alginate and algin products, hydroxypropyl cellulose, hydroxyethyl cellulose, and other similar aqueous thickeners that have some substantial proportion of water solubility. Preferred thickeners for use in the alkaline composition of the invention are xanthan thickeners sold by the Kelco Division of Merck under the tradenames KELTROL, KELZAN AR, KELZAN D35, KELZAN S, KELZAN XZ, and others. Such xanthan polymers are preferred due to their high water solubility, and great thickening power. The preferred thickener for acid compositions of the invention comprise polyvinyl alcohol thickeners. Most preferably fully hydrolyzed (greater than 98.5 mol% acetate replaced with the —OH function). Preferred thickeners for inorganic alkaline cleaners include xanthan gum derivatives. Xanthan is an extracellular polysaccharide of xanthomonas campestras. Xanthan is made by fermentation based on corn sugar or other corn sweetener by-products. Xanthan comprises a poly beta-(1→4)-D-Glucopyranosyl backbone chain, similar to that found in cellulose. Aqueous dispersions of xanthan gum and its derivatives exhibit novel and remarkable rheological properties. Low concentrations of the gum have relatively high viscosity which permit it economical use and application. Xanthan gum solutions exhibit high pseudoplasticity, i.e. over a wide range of concentrations, rapid shear thinning occurs that is generally understood to be instantaneously reversible. Non-sheared materials have viscosity that appears to be independent of the pH and independent of temperature over wide ranges. Preferred xanthan materials include cross-linked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which patent is incorporated by reference herein. Suitable crosslinking agents for xanthan materials include metal cations such as Al+3, Fe+3, Sb+3, Zr+4 and other transition metals, etc. Known organic crosslinking agents can also be used. The preferred crosslinked xanthan agent of the invention is KELZAN AR, a product of Kelco, a division of Merck Incorporated. KELZAN AR is a crosslinked xanthan that provides a thixotropic cleaner that can produce large particle size mist or aerosol when sprayed.

Sequestrant

The thickened materials of the invention can contain an organic or inorganic sequestrant or mixtures of sequestrants. Organic sequestrants such as citric acid, the alkali metal salts of nitrilotriacetic acid (NTA), EDTA, alkali metal gluconates, polyelectrolytes such as a polyacrylic acid, and the like can be used herein. The most preferred sequestrants are organic sequestrants such as sodium gluconate due to the compatibility of the sequestrant with the formulation base.

The present thickened cleaning materials will also comprise an effective amount of a water-soluble organic phosphonic acid which has sequestering properties. Preferred phosphonic acids include low molecular weight compounds containing at least two anion-forming groups, at least one of which is a phosphonic acid group. Such useful phosphonic acids include mono-, di-, tri- and tetra-phosphonic acids which can also contain groups capable of forming anions under alkaline conditions such as carboxy, hydroxy, thio and the like.

Among these are phosphonic acids having the formulae:

$R_1N[CH_2PO_3H_2]_2$ or $R_2C(PO_3H_2)_2OH$, wherein $R_1$ may be -[(lower)alkylene]$N[CH_2PO_3H_2]_2$ or a third—$CH_2PO_3H_2$ moiety; and wherein $R_2$ is selected from the group consisting of $C_1C_6$ alkyl.

The phosphonic acid may also comprise a low molecular weight phosphonopolycarboxylic acid such as one having about 2–4 carboxylic acid moieties and about 1–3 phosphonic acid groups. Such acids include 1-phosphono-1methylsuccinc acid, phosphonosuccinic acid and 2-phosphonobutane-1,2,4-tricarboxylic acid.

Other organic phosphonic acids include 1-hydroxyethylidene-1,1-diphosphonic acid ($CH_3C(PO_3H_2)_2OH$), available from Monsanto Industrial Chemicals Co., St. Louis, Mo. as Dequest® 2010, a 58–62% aqueous solution; amino [tri(methylenephosphonic acid)] ($N[CH_2PO_3H_2]_3$), available from Monsanto as Dequest® 2000, a 50% aqueous solution; ethylenediamine [tetra(methylene-phosphonic acid)] available from Monsanto as Dequest® 2041, a 90% solid acid product; and 2-phosphonobutane-1,2,4-tricarboxylic acid available from Mobay Chemical Corporation, Inorganic Chemicals Division, Pittsburgh, Pa. as Bayhibit AM, a 45–50% aqueous solution. It will be appreciated that, the above-mentioned phosphonic acids can also be used in the form of water-soluble acid salts, particularly the alkali metal salts, such as sodium or potassium; the ammonium salts or the alkylol amine salts where the alkylol has 2 to 3 carbon atoms, such as mono-, di-, or tri- ethanolamine salts. If desired, mixtures of the individual phosphonic acids or their acid salts can also be used. Further useful phosphonic acids are disclosed in U.S. Pat. No. 4,051,058, the disclosure of which is incorporated by reference herein.

The present compositions can also incorporate a water soluble acrylic polymer which can act to condition the wash solutions under end-use conditions. Such polymers include polyacrylic acid, polymethacrylic acid, acrylic acid-methacrylic acid copolymers, hydrolyzed polyacrylamide, hydrolyzed polymethacrylamide, hydrolyzed acrylamidemethacrylamide copolymers, hydrolyzed polyacrylonitrile, hydrolyzed polymethacrylonitrile, hydrolyzed acrylonitrilemethacrylonitrile copolymers, or mixtures thereof. Water-soluble salts or partial salts of these polymers such as the respective alkali metal (e.g. sodium or potassium) or ammonium salts can also be used. The weight average molecular weight of the polymers is from about 500 to about 15,000 and is preferably within the range of from 750 to 10,000. Preferred polymers include polyacrylic acid, the partial sodium salt of polyacrylic acid or sodium polyacrylate having weight average molecular weights within the range of 1,000 to 6,000. These polymers are commercially available, and methods for their preparation are well-known in the art.

For example, commercially-available water-conditioning polyacrylate solutions useful in the present cleaning solutions include the sodium polyacrylate solution, Colloid® 207 (Colloids, Inc., Newark, N.J.); the polyacrylic acid solution, Aquatreat®AR-602-A (Alco Chemical Corp., Chattanooga, Tenn.); the polyacrylic acid solutions (50–65% solids) and the sodium polyacrylate powders (m.w. 2,100 and 6,000) and solutions (45% solids) available as the Goodrite®°K-700 series from B. F. Goodrich Co.; and the sodium- or partial sodium salts of polyacrylic acid solutions (m.w. 1000–4500) available as the Acrysol® series from Rohm and Haas.

The present invention can also incorporate sequestrants to include materials such as, complex phosphate sequestrants, including sodium tripolyphosphate, sodium hexametaphosphate, and the like, as well as mixtures thereof. Phosphates, the sodium condensed phosphate hardness sequestering agent component functions as a water softener, a cleaner, and a detergent builder. Alkali metal (M) linear and cyclic condensed phosphates commonly have a $M_2O:P_2O_5$ mole ratio of about 1:1 to 2:1 and greater. Typical polyphosphates of this kind are the preferred sodium tripolyphosphate, sodium hexametaphosphate, sodium metaphosphate as well as corresponding potassium salts of these phosphates and mixtures thereof. The particle size of the phosphate is not critical, and any finely divided or granular commercially available product can be employed.

Sodium tripolyphosphate is a preferred inorganic hardness sequestering agent for reasons of its ease of availability, low cost, and high cleaning power. Sodium tripolyphosphate acts to sequester calcium and/or magnesium cations, providing water softening properties. It contributes to the removal of soil from hard surfaces and keeps soil in suspension. It has little corrosive action on common surface materials and is low in cost compared to other water conditioners. Sodium tripolyphosphate has relatively low solubility in water (about 14 wt-%) and its concentration must be increased using means other than solubility. Typical examples of such phosphates being alkaline condensed phosphates (i.e. polyphosphates) such as sodium or potassium pyrophosphate, sodium or potassium tripolyphosphate, sodium or potassium hexametaphosphate, etc.

Metal Protector

The compositions of the invention can contain a material that can protect metal from corrosion. Such metal protectors include for example sodium gluconate and sodium glucoheptonate.

In addition to the recited components of the compositions of the invention there may also be present adjuvant materials for hard surface cleaning. Such adjuvant materials may include foam enhancing agents, foam suppressing agents (when desired), preservatives, antioxidants, pH adjusting agents, perfumes, colorants, or pacifying or pearlescent agents, builder salts, cosolvents and other useful well understood material adjuvants.

The materials of the invention are commonly applied to soiled surfaces using a pressurized aerosol or aerosol pump spray. In pressurized aerosol application, the compositions of the invention are combined with a aerosol propellant and packaged in a metal high pressure container. Typical propellants include lower alkanes such as propane, butane, nitrous oxide, carbon dioxide, and a variety of fluorocarbons. Pressurized aerosol containers typically include a spray head, valve and dip tube that reaches to the opposite end of the container to ensure that the entire contents of the container is dispensed through the action of the propellant. When the valve is opened (depressed), the propellant pressure forces liquid into the dip tube and through the aerosol spray head. At the spray head exit, a spray pattern is created by the geometry of the aerosol valve which directs the material onto the soiled surface. Aerosol containers, dip tubes, propellants and spray valves are well understood commercial technology. Pump spray devices commonly comprise a container spray head valve pump and dip tube. Actuating the pump causes a piston to travel in a cylinder filled with compositions of the invention. The piston motion forces the composition through an aerosol valve causing the spray to adhere to a soiled surface. Once the piston reaches its full travel path, the piston is returned by a spring action to its original position causing the cylinder to fill with additional quantities of the spray material through a valve opening. As the piston is again pressed through the cylinder the valve closes preventing the exit of any of the solution from the cylinder. The pump spray can deliver substantial quantities of the material onto the soiled surface.

The materials of the invention can be made by combining the ingredients in an aqueous diluent using commonly available containers and blending apparatus. A preferred method for performing the composition of the invention includes introducing into a stirred production vessel, a quantity of the deionized water followed by the organic thickener material used to provide thixotropic properties to the compositions of the invention. After the thickener is fully solubilized, the other ingredients of the invention can be added in any order.

The following examples, experiments and data provide a basis for understanding the nature of the invention and include a best mode.

Experimental

A. Cleaning Capacity

The following preparation was tested for cleaning using a hood and grill soil test or a Crisco test.

Hood and Grill Soil Test

This test is meant to simulate a cleaner's ability to remove polymerized oils from institutional hoods, ovens, and grills.

A 2.5 gram sample of Mazola brand corn oil is spread evenly onto a 14 inch by 14 inch sheet of stainless steal. The sheet is heated at 200° C. for three hours. The heating procedure causes the oil to polymerize to a tenacious varnish-like yellow film.

A composition's cleaning ability is measured relative to a standard formulation. One gram samples of the test formulation and the standard are placed onto the polymerized film using a dropper. This is done at room temperature. The time required for the compositions to cause the film to loosen is recorded. By loosen is meant that the film wrinkles and lifts from the stainless steel surface to the point where it is removed by running tap water over the sheet.

Crisco Test

This test is meant to simulate a cleaner's ability to remove freshly deposited, non-polymerized oils and greases from hard surfaces found in institutional kitchens. A one gram sample of Crisco brand all-vegetable shortening is spread evenly onto a 10 inch by 10 inch glass door of a laboratory hood.

A composition's cleaning ability is measured relative to a standard formulation. A test formulation is sprayed onto the soil through an Affa Sprayer No. 5910BA. Five sprays are used in a "domino" pattern. After the fifth spray, the composition is allowed to remain in contact with the soil for one minute before wiping. A Scott brand laboratory Soft Cote Wipe is used to wipe off the soil. Following the wipe, one additional spray is applied to the surface and a new wipe is used to, again, wipe the surface. The efficacy of the cleaner is measured during the one minute after the initial spray and after each wiping. A satisfactory test formulation emulsifies and lifts the soil during the one minute, and leaves a grease free surface after wiping. In particular, the surface should be clean and streak free after the second wipe.

EXAMPLE 1

Into an appropriately sized metallic container equipped with a stirring apparatus is charged 3071.4 grams of deionized water. Slowly into the agitated water is placed 7.57 grams of KELZAN AR, a cross-linked xanthan gum manufactured by Kelco, a division of Merck Co. After the KELZAN solution is uniform, 340.65 grams of a 50 wt % active aqueous solution of sodium hydroxide is slowly added to the thickened water. The sodium hydroxide is followed by 75.7 grams of cocoamidopropyl-betaine (30% active) and 18.92 grams of sodium lauryl ether sulfate (60 wt% active aqueous solution). The solution was stirred until uniform and 60.56 grams of sodium gluconate followed by 18.9 grams of a $C_{10-12}$ alkyldimethyl amine oxide (30% active) was introduced into the solution followed by 5.67 grams of d-limonene fragrance and 185.46 grams of butyl cellosolve. Lastly, 0.12 gram of a mixed dye was added to the solution. The composition of Example 1 was tested for its ability to clean common greasy soil. A 10 inch×10 inch area of glass was coated with 1 gram of Crisco brand shortening. Formula I was diluted to 50 wt% and was sprayed on such 10 inch×10 inch sample of grease. The 50 wt % diluted concentration cut the grease cleanly. The material, in a hood and grill soil test, when applied to hood and grill soil samples, removed 100% of the soil in 3 minutes, 25 seconds. Both neat and 50 wt % active dilutions of the material produced non-choking mists when sprayed. In performing the spray tests of the materials of the invention, a spray head known as Affa Sprayer No. 5910BA, was selected. The selection of the spray head was made because the spray generated by this spray head was known to be most irritating when used with highly alkaline or highly acidic cleaning compositions. Any reduction in the production of irritating mists or aerosols obtained with this spray head would be a significant proof of the ability of the compositions to reduce production of irritating mists or aerosols in a worse case scenario.

EXAMPLES 2A-C

| | Weight Percent | | |
|---|---|---|---|
| Ingredient | 2A | 2B | 2C |
| Water | 83.05 | 83.65 | 81.85 |
| Xanthan (KELZAN AR) | 0.2 | 0.0 | 0.2 |
| Sodium Hydroxide (50 wt % active aqueous) | 9.0 | 9.0 | 9.0 |
| Coco Amido Propyl Betaine (30% active) | 2.0 | 2.0 | 2.0 |
| Sodium Gluconate | 1.0 | 1.0 | 1.0 |
| Lauryl Ether Sulfate (60% active) | 0.5 | — | — |
| $C_{10-12}$ Dimethylamine Oxide (30% active) | 0.5 | 0.5 | 0.5 |
| Monoethanolamine | 3.0 | 3.0 | — |
| d-limonene (fragrance) | 0.15 | 0.15 | 0.15 |
| Butyl Cellosolve | — | — | 5.0 |
| Dye | 0.005 | — | — |

A test of the Example 2B at a 50 wt % active dilution in water resulted in a 100% cleaning of the Crisco test sample.

Testing on hood and grill soil gave the following results.

| | Time Exposure | % Removal | Time of Lift |
|---|---|---|---|
| Example 2B | 2:55 | 97 | 2:20 |
| Example 2C | 2:25 | 100 | 2:04 |

The data shown in conjunction with Examples 1 and 2 demonstrate the cleaning capacity of the compositions of the invention. Both the Crisco tests and the hood and grill soil tests show that soils commonly encountered in the food preparation environment can be rapidly and substantially completely removed using the cleaning compositions of the invention. The formulations of the invention that are reduced misting do not suffer any loss of cleaning capacity for improvement in respiratory compatibility.

B. Particle Size Analysis and Surface Tension Results—Caustic Formulas

Particle size analysis test formulations were dispensed through an aerosol misting sprayer (Affa Sprayer No. 5910BA) into a Malvern Instruments Particle Sizer model INDP.

Surface tensions were evaluated on a Kruss K-12 autotensiometer using a Du Nouy ring at 25° C.

The irritating effect of the test formulations were evaluated by spraying the test formulations into a laboratory sink with the same aerosol misting sprayer as used for the particle size analysis and having the person doing the spraying inhale the air over the sink and record the level of irritation on a 0–5 scale with 0 being no irritation and 5 being very irritating.

EXAMPLES 3A–C

The caustic formulations evaluated are as follows:

| | Weight Percent Formula | | |
|---|---|---|---|
| Ingredient | 3A | 3B | 3C |
| Water | to 100% | to 100% | to 100% |
| KELZAN AR | 0.2 | 0.2 | — |
| NaOH (50% aqueous) | 9.0 | 9.0 | 9.0 |
| Monoethanolamine (99% active) | 3.0 | 3.0 | 3.0 |
| Coco Amido Propyl Betaine (30% active, aqueous) | 2.0 | — | 2.0 |
| $C_{12-14}$ dimethyl amine oxide (30% active, aqueous) | 0.5 | — | 0.5 |
| Sodium Gluconate | 1.6 | 1.6 | 1.6 |

Test Results are as follows:

| Formula | Irritation Rating | Median Particle Micrometers | Surface Tension Dynes/cm |
|---|---|---|---|
| 3A | 1 | 206.5 | 29.1 |
| 3B | 1 | 212.1 | 52.5 |
| 3C | 5 | 107.9 | 31.7 |

The level of irritation for formula 3A is rated as a 1. This is not complete elimination of irritation, but a significant reduction. Compared to a similar formula (3C) made without thickener a substantial improvement has been achieved. Likewise the level of irritation for the formula (3B) made with KELZAN AR but without surfactants is also 1. The formulation (3C) without KELZAN AR but with surfactants is rated at an irritation level of 5. The surface tension results do not appear to correlate with the level of irritation. Formula (3C) has a low surface tension but is very irritating, while formula (3A) has a similar surface tension but shows a greatly reduced level of irritation. Formula 3B is low in irritation but has increased surface tension. The level of irritation does correlate to particle size. Highly irritating formulation 3C has a median particle size of 107.9 micrometers, while the two reduced irritation formulas have a larger median particle size of 206.5 and 212.1 micrometers. We believe the KELZAN AR holds the composition droplets together and mitigates the fine mist that gets into the air and causes the irritation.

C. Particle Size Analysis and Surface Tension Results—Acid Formulas

EXAMPLES 4A–D

The acidic formulations evaluated are as follows:

| | Weight Percent Formula | | | |
|---|---|---|---|---|
| Ingredient | 4A | 4B | 4C | 4D |
| Water | to 100% | to 100% | to 100% | to 100% |
| Polyvinyl alcohol (PVA) (high molecular weight fully hydrolyzed Airvol 350) | 0.3 | 0.5 | 0.3 | — |
| Phosphoric acid (75%) | 11.625 | 11.625 | 11.625 | 11.625 |
| Citric acid (50%) | 4.875 | 4.875 | 4.875 | 4.875 |
| Butyl carbitol | 4.000 | 4.000 | 4.000 | 4.000 |
| Nonyl phenol ethoxylate (9.5 mole) | 1.000 | 1.000 | — | 1.000 |
| $C_{12-14}$ dimethyl amine oxide (30%) | 3.500 | 3.500 | — | 3.500 |

Test results are as follows:

| Formula | Irritation Rating | Median Particle Micrometers | Surface Tension Dynes/cm |
|---|---|---|---|
| 4A | 0 | 259.9 | 32.3 |
| 4B | 0 | 250.3 | 32.3 |
| 4C | 3 | 126.9 | 34.6 |
| 4D | 3 | 165.1 | 32.1 |

The level of irritation for the complete formulas (4A and 4B) made with 0,3 and 0 ,5% PVA is rated as zero. Again this rating correlates with particle size and not surface tension, The particle size results obtained with formula 4C indicates that it is the combination of surfactant and PVA that increases the median particle size, The data above suggest that with median particle sizes above 200 micrometers that the irritating mist is greatly reduced. All of the data above were with concentrated formulas that are known to be quite irritating.

We have demonstrated that the cleaning compositions of the invention which include a highly alkaline material or a highly acid material as an active cleaning component in conjunction with other cleaning ingredients in a thickened aqueous material provides excellent soil removal properties. We have further shown that the irritating effects of mists or aerosols generated using the compositions of the invention in a spray device, can be substantially removed if the material sprayed results in a median particle size that is greater than 200 μm. The thickened materials of the invention do not lose any cleaning capacity once formulated to produce a low particle size aerosol or mist.

The above specification, examples and data provide a basis for understanding the disclosed invention, any embodiments of the invention can be made without departing from the spirit and scope of the invention. The invention resides in the claims hereinafter appended.

We claim:

1. A thixotropic sprayable strongly alkaline cleaner composition, formulated to reduce the formation of a choking aerosol when sprayed, the composition comprising:

(a) an effective cleaning amount of an alkali metal hydroxide;

(b) an effective amount of organic surfactant;

(c) an effective thickening amount of an organic polymer thickener; and (d) water;

wherein the alkaline composition obtains a median airborne aerosol particle size of greater than about 170 μm when sprayed.

2. The composition of claim 1 wherein the composition comprises about 1 to about 20 wt % of an alkali metal hydroxide.

3. The composition of claim 2 wherein the composition additionally comprises an organic base.

4. The composition of claim 1 wherein the composition comprises about 0.01 to about 5 wt % of the corrosion inhibitor.

5. The composition of claim 4 wherein the alkali metal hydroxide comprises sodium hydroxide.

6. The composition of claim 1 wherein the composition comprises about 0.01 to about 5 wt % of the organic polymer thickener.

7. The composition of claim 1 wherein the median airborne aerosol particle size is greater than about 200 μm.

8. A thixotropic sprayable strongly acidic hard surface cleaner composition, formulated to reduce the formation of a choking aerosol when sprayed, the composition comprises:

(a) an effective cleaning amount of a strong acid;

(b) an effective amount of an organic surfactant composition;

(c) an effecting thickening amount of an organic polymer thickener; and (d) water;

wherein the acid composition obtains a median airborne aerosol particle size of greater than about 170 μm when sprayed.

9. The composition of claim 8 wherein the median airborne aerosol particle size is greater than 200 μm.

10. The composition of claim 8 wherein the strong acid comprises a strong mineral acid.

11. The composition of claim 8 wherein the acid comprises phosphoric acid.

12. The composition of claim 8 wherein the acid comprises a mixture of a mineral acid and an organic acid selected from the group consisting of acetic acid, citric acid, sulfamic acid, maleic acid, fumaric acid, benzoic acid and mixtures thereof.

13. The composition of claim 8 wherein the organic surfactant is an amphoteric surfactant.

14. The composition of claim 8 wherein the organic surfactant comprises a nonionic surfactant.

15. The composition of claim 8 wherein the organic surfactant comprises a cationic surfactant.

16. The composition of claim 8 wherein the organic surfactant comprises a combination of a polyalkylene oxide nonionic surfactant and an alkyl dimethyl amine oxide cationic surfactant.

17. The composition of claim 8 which additionally comprises a compatible solvent.

18. A sprayable, strongly alkaline oven cleaner composition, formulated to reduce the formation of a choking aerosol when sprayed, the composition comprising:

(a) about 1 to about 15 wt % of a strong base comprising a mixture of (i) an alkali metal hydroxide and (ii) an organic base comprising monoethanol amine, diethanol amine, triethanol amine, or mixtures thereof;

(b) about 0.1 to about 5 wt % of a corrosion inhibitor for ferrous metals;

(c) about 0.01 to about 2 wt % of a crosslinked xanthan thickener composition (d) about 0.01 to about 5 wt % of a cationic amine oxide surfactant; and (e) about 0.01 to about 5% of an amphoteric surfactant wherein the alkaline composition obtains a median airborne aerosol particle size greater than 170 μm when sprayed.

19. The composition of claim 18 wherein the weight ratio of the alkali metal hydroxide to the organic base is about 1-10 parts by weight of an alkali metal hydroxide per each 1 part by weight of the organic base.

20. The composition of claim 18 wherein the median airborne aerosol particle size is greater than 200 μm, the alkali metal hydroxide comprises sodium hydroxide and the organic base comprises monoethanol amine and wherein the composition comprises about 1 to 15 wt % total base and the weight ratio of alkali metal hydroxide to monoethanol amine is about 1 to about 5 parts of sodium hydroxide per part of monoethanol amine.

21. The composition of claim 18 wherein the composition comprises an amphoteric surfactant.

22. The composition of claim 21 wherein the amphoteric surfactant comprises a $C_{6-18}$ alkyl amido $C_{1-5}$ alkyl betaine.

23. The composition of claim 18 wherein the amine oxide surfactant comprises a $C_{8-18}$ alkyl dimethyl amine oxide surfactant.

24. The composition of claim 18 wherein the corrosion inhibitor comprises sodium gluconate.

25. A sprayable strongly acidic hard surface cleaner composition, formulated to reduce the formation of choking aerosol when sprayed, the composition comprising:

(a) about 1-20 wt % of a strong acid composition;

(b) about 1-20 wt % of an organic surfactant;

(c) about 0.01 to about 10 wt% of a polyvinyl alcohol thickener composition;

(d) about 0.1 to 10 wt % of an hydroxy substituted organic solvent composition; and (e) water;

wherein the acid cleaner composition obtains a median airborne aerosol particle size of greater than about 200 μm when sprayed.

26. The composition of claim 25 wherein the polyvinyl alcohol composition has a molecular weight greater than about 20,000.

27. The composition of claim 25 wherein the polyvinyl alcohol composition has a degree of hydrolysis of greater than about 87%.

28. The composition of claim 25 wherein the strong acid comprises a mixture of a strong mineral acid and an organic acid.

29. The composition of claim 28 wherein the mixture comprises phosphoric acid and a carboxylic acid selected from the group consisting of citric acid, maleic acid, fumaric acid, benzoic acid, sorbic acid, sulfamic acid and mixtures thereof.

30. The composition of claim 25 wherein the hydroxy substituted organic solvent comprises methanol, ethanol, propanol, isopropanol, ethylene glycol, diethylene glycol, propylene glycol, dipropylene glycol, propylene glycol methyl ether, propylene glycol ethyl ether, propylene glycol propyl ether, dipropylene glycol methyl ether, ethylene glycol methyl ether, ethyl glycol butyl ether, diethylene glycol butyl ether, etc., and mixtures thereof.

31. The method of cleaning a hard surface using a sprayed aqueous cleaning composition that can be used without generating choking aerosol, which method comprises:

(a) contacting a soiled surface with an aqueous cleaner in composition comprising a strong acid or a strong base, an organic surfactant and a polymeric thickener in the form of an aerosol or spray having a median particle size greater than about 170 μm to form a treated hard surface having a cleaning film; and (b) wiping the hard surface to remove the treating film and any soil.

* * * * *